United States Patent [19]

Swartz

[11] 4,380,348

[45] Apr. 19, 1983

[54] PIPE CLAMPING ASSEMBLY

[75] Inventor: Frederick R. Swartz, Needham Heights, Mass.

[73] Assignee: Clamp-All Corp., Billerica, Mass.

[21] Appl. No.: 235,531

[22] Filed: Feb. 18, 1981

[51] Int. Cl.³ ............................................. F16L 21/06
[52] U.S. Cl. ..................................... 285/236; 285/373
[58] Field of Search ................ 285/236, 373, 419, 365

[56] References Cited

U.S. PATENT DOCUMENTS

| | | | |
|---|---|---|---|
| 3,061,339 | 10/1962 | Jewell | 285/236 |
| 3,104,898 | 9/1963 | MacDonald et al. | 285/236 |
| 3,232,647 | 2/1966 | Kirchoff | 285/236 |
| 3,376,055 | 4/1968 | Donroe | 285/236 |
| 3,479,066 | 11/1969 | Gittleman | 285/236 |
| 3,565,468 | 2/1971 | Garrett | 285/373 |
| 4,101,151 | 7/1978 | Ferguson | 285/236 |
| 4,172,607 | 10/1979 | Norton | 285/236 |

FOREIGN PATENT DOCUMENTS

| | | | |
|---|---|---|---|
| 2157192 | 7/1972 | Fed. Rep. of Germany | 285/236 |
| 534266 | 3/1941 | United Kingdom | 285/236 |
| 794580 | 5/1958 | United Kingdom | 285/373 |

Primary Examiner—Thomas J. Callaghan
Attorney, Agent, or Firm—Wolf, Greenfield & Sacks

[57] ABSTRACT

A pipe clamping assembly is provided with an improved first and second encircling ends on a sheet metal clamping band so as to provide upward and reversely extending end sections each having an inwardly directed flange positioned to extend toward an underlying pipe and act in conjunction with the clamping band to prevent unwanted movement of an underlying sealing gasket under operating conditions of the pipe clamping assembly. In one embodiment, the ends are slotted to allow for adjustment to inexact contours while in another embodiment, the band is unslotted providing greater rigidity for use with pipes of consistently repeatable defined circumference.

4 Claims, 6 Drawing Figures

PIPE CLAMPING ASSEMBLY

BACKGROUND OF THE INVENTION

Many end to end pipe coupling and clamping assemblies are known for joining rigid pipe in a string. For example, cast iron pipe employed for sewerage, sanitary and domestic plumbing requirements typically is clamped together with the pipe ends in a fluid tight, sealing and aligned relationship. Clamping assemblies of the type described in U.S. Pat. No. 4,101,151 issued July 18, 1978 has been found particularly desirable for use in connection with such cast iron pipe. Such clamp assemblies as are known, comprise a clamping band of sheet material which is corrosion-free and carries an underlying gasket positioned therein adapted to be held in tight sealing relationship spanning a joint between pipes. The relationship is maintained by tensioned band straps mounted on the clamping band over a slotted portion thereof overlying each of two aligned pipes to be joined.

Many other pipe clamp assemblies are known and include the many references recited in the above-noted patent. U.S. Pat. No. 3,104,898 issued Sept. 24, 1963 is one of the references recited in U.S. Pat. No. 4,101,151 and describes a clamping band of somewhat different configuration carrying packing retaining means at axially opposed ends of the band.

It has now been found desirable to provide modified clamp assemblies, for use in joining two pipes in end to end relationship which are simple, can easily be manufactured and easily applied to join the pipes in fluid sealing relationship. The modified clamp assemblies can be maintained under a variety of conditions of use and provide for positive positioning of a gasket means used during installation and at extremes of environmental conditions and normal use conditions.

SUMMARY OF THE INVENTION

It is an object of this invention to provide an improved clamping assembly for joining together, in end to end relationship, rigid pipes, in fluid sealing relationship, which clamping assembly provides good sealing and clamping under extremes of operating conditions.

Still another object of this invention is to provide a clamping assembly in accordance with the preceding object which has positive positioning of a sealing gasket when applied as well as when exposed to severe operating conditions and which can be provided in modified forms for use with a variety of different pipe types.

Still another object of this invention is to provide improved methods of sealing pipe joints using compressed gaskets while limiting undesired flow thereof.

According to the invention a pipe coupling or clamping assembly has in combination a central flexible, sheet metal clamping band of defined circumferential length with a first encircling end, and a second encircling end axially spaced from the first encircling end with a preformed, raised, central section extending generally the defined circumferential length of the clamping band transverse to the axis of pipe with which the assembly is used. Band strap retaining areas extend on both sides of the central section with the band enclosing an underlying compressible, circumferential, sealing gasket partially mounted against movement by the central section. An improvement in such a clamping assembly comprises the first and second encircling ends each carrying an upwardly and reversably extending section defining an inwardly directed flange positioned to extend toward an underlying pipe and to prevent unwanted movement of the sealing gasket under operating conditions of the clamping assembly.

The sealing gasket is subject to cold flow when clamped in position and in use. The inwardly directed flange acts in one embodiment of this invention to both aid in preventing excessive and unwanted cold flow while also positively positioning the clamping assembly with respect to pipe with which it is used. In a first preferred embodiment, the clamping band has a plurality of preferably parallel slots extending in the band strap retaining areas and permitting contraction of these areas to conform the inwardly extending flanges to a pipe surface which may be somewhat irregular from one pipe end to another. In a second embodiment, no slots are used and the band is substantially more rigid than the slotted embodiment. This embodiment is particularly useful with pipes which require rigid couplings and which have uniform outer diameters consistent from length to length as for example plastic, metal and fiberglass reinforced pipe.

According to the method of this invention a joint between two axially extending pipes is sealed by placing a preformed elastomeric gasket thereover which gasket has a raised area, and surrounding the gasket with a sheet metal clamping band having a central raised area. The raised area of the gasket and band are nested to provide first retaining and positioning means for the gasket. The band has inwardly directed flanges at both ends thereof. Tension straps then apply a compressing force to seal the pipe joint while retaining the gasket against flow beyond outer ends of the clamping band.

It is a feature of this invention that the inwardly depending flanges can act to engage the clamping assembly positively on pipe to be joined as by directly contacting and resting on or cutting into an underlying pipe surface. Thus the flanges act for positive positioning of the gasket. In addition when the joints are subjected to extremes of temperature as for example extremely high or low temperatures, unwanted expansion of the gasket beyond the joint area can be prevented by the flanges while slippage of the gasket can further be prevented by the flanges during shrinkage. In the initial positioning of the clamping assembly, the gasket is compressed when band straps are compressed about the clamping band. Because the encircling ends provide a raised area, in some embodiments, there is room for flow of the gasket material into these areas without flow beyond the outer edges of the clamping assembly. When neoprene gaskets are used and the clamp band tightened, cold flow would tend to cause the gasket to extend beyond the overlying clamp band if not for the stopping action of the inwardly directed flanges. If allowed to flow excessively, the joints could be weakened and if there is blockage in the pipe joint, excessive pressure could build up which could destroy the joints made. The end flanges tend to prevent weakening of the joint by preventing cold flow of the gasket originally and under environmental extremes.

In the solid clamping band embodiment used, where no slots are used for flexibility, the inner diameter of the inwardly directly flanges can substantially exactly match the outer diameter of the pipe, such as plastic and other uniform pipe, to again predetermine the position of the clamping assembly when tightened. With cast iron soil pipe, where the outer diameter is somewhat irregular, the flexible slotted joint ends are preferred.

BRIEF DESCRIPTION OF THE DRAWINGS

The above and other features, advantages and details of the invention will be better understood from a reading of the following specification in conjunction with the attached drawings in which.

DESCRIPTION OF PREFERRED EMBODIMENTS

Figure 1:
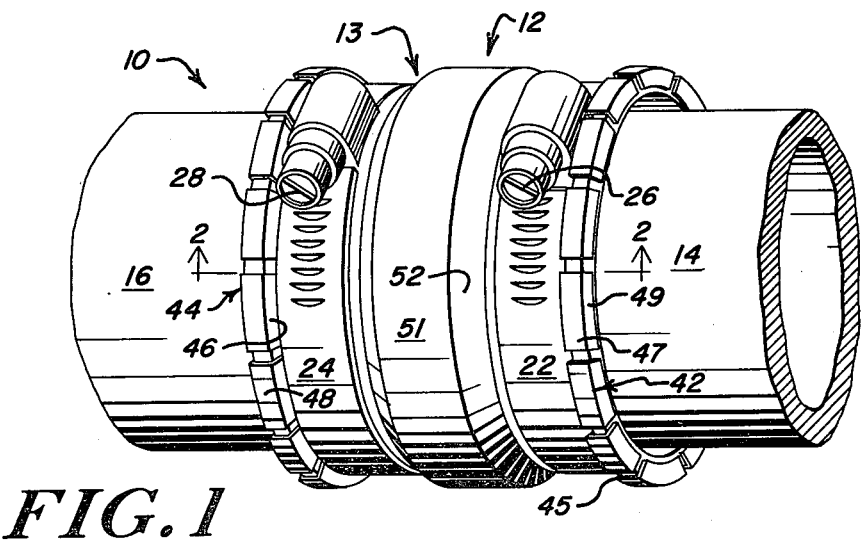
FIG. 1 is a perspective view of a pair of pipes assembled together with the preferred embodiment of the pipe clamp assembly of the present invention.
Figure 2:
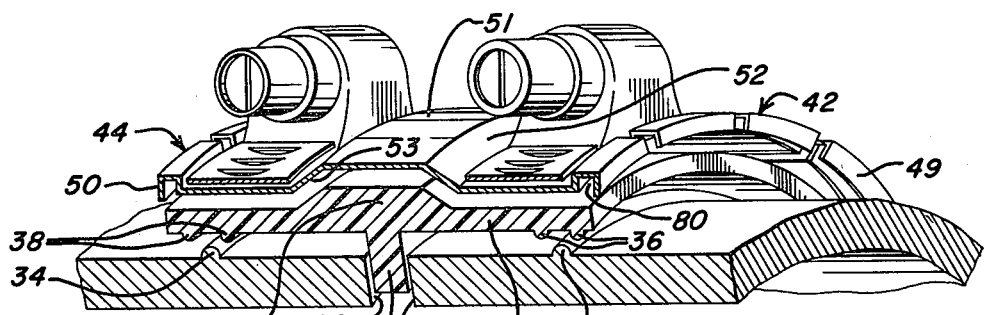
FIG. 2 is an enlarged sectional perspective view along lines 2—2 of FIG. 1.
Figure 3:
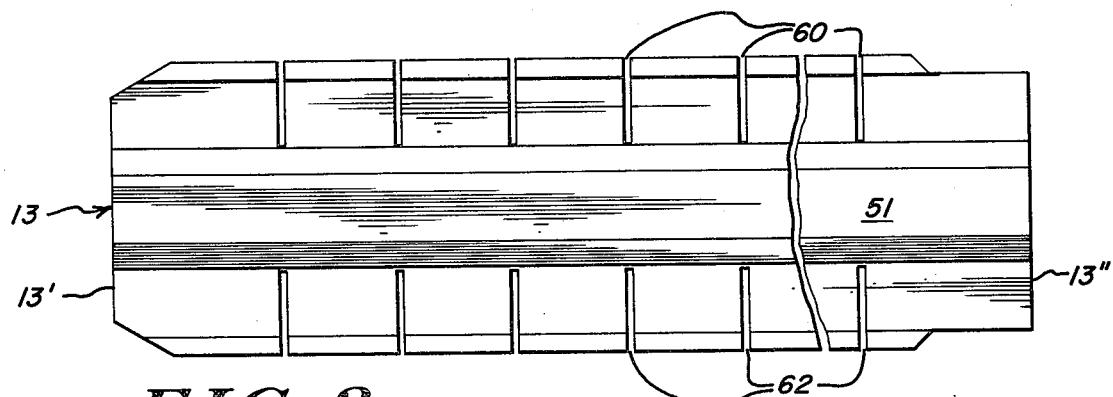
FIG. 3 is a top plan view of the clamping band of the clamping assembly.

With reference now to the drawings and more particularly FIGS. 1-3, a preferred embodiment of this invention is disclosed comprising a pipe assembly 10 joined together by the clamping assembly 12 or coupling of this invention. The clamping assembly 12 clamps and couples together, in sealed relationship first pipe 14 and second pipe 16. The substantially identical cast iron soil pipe ends 18 and 20 are axially aligned in end to end relationship and the pipes carry first and second transverse peripheral pipe beads 32 and 34.

The assembly 12 comprises a central clamping band 13 of defined circumferential length having a first band end 13′ adapted to overlie a nestable, second slidably adjustable band end 13″ when assembled as shown in FIG. 1. The clamp band surrounds the joint between the pipes 14 and 16 with the ends 13′ and 13″ overlapping slightly.

The clamp band 13 has continuous substantially 90 degree, raised, outer encircling edge bead 42 and 44 as will be more fully described. The edge beads 42 and 44 comprise the improvement of this invention with other structures described above being shown in U.S. Pat. No. 4,101,151. Each outer edge bead 42 and 44 has an upwardly extending portion 45 and 46 respectively, facing a band strap retaining area, and a top portion 47, 48 respectively encircling the underlying pipe and having a reversely bent inwardly directly flange 49, 50 respectively defining an inner diameter adapted to tightly grip an underlying soil pipe or other pipe construction.

The clamping band 13 has a flat, central, raised section 51, joined by 45 degree sides 52, 53 extending from either side of the raised section of the clamping band to a parallel, flat strap retaining area on either side defined between the walls 45 and 52 and walls 46 and 53. The clamping band carries a plurality of preferably parallel slots, 60, 62 extending inwardly on either side of the thin metal material of the clamping band and generally axially aligned to the axis of the pipes 14 and 16. The slots 60 and 62 preferably extending inwardly a desired length and angularly to permit conformance of the band about the pipe diameter. Generally the slots extend into the strap retaining areas as far as the walls 52 and 53.

The band clamp may carry spaced slots at intervals of ½ to 2 inches along the length of the band which may extend from outer ends about ½ to about 2 inches.

In the strap retaining areas there are disposed band straps 22 and 24 of a conventional nature. These band straps have threaded tension bolts 26 and 28 of known construction enabling screw thread tightening to compress the underlying clamping band 13. The straps can be tightened about the external periphery of the clamping band. The band strap retaining areas are preferably slightly wider than the width of the straps 22, 24 and they are retained in the area and prevented from sidewise movement during compression of the clamping band.

An elastomeric sealing gasket 30 having outer parallel gasket beads 36 and 38 fit on either side of the pipe beads 32 and 34 and act to aid in forming a sealing relationship about the periphery of each pipe 14 and 16 when the gasket is compressed. The gasket further has an inwardly directed central protrusion 64 which extends between butting ends 18 and 20 of the pipes 14 and 16 to provide a gas and liquid sealing means directly between the ends and to provide a cushion for the ends of the pipe. The elastomeric gasket 30 also includes a raised central gasket area 40, which conforms to a generally sectional trapezoidal shape of the raised trapezoidal central raised section 51 of the clamping band 13 and fits snugly therein, so that the gasket is prevented from shifting during use by one positive stop. If desired each of the band straps 22 and 24 can be secured by a rivet, spot weld or other means to the clamping band in the strap retaining area although this is not required. The elastomeric sealing gasket 30 may be secured to the underlying surface of the band clamp by adhesive, or the band straps and/or gasket may be used separately and may be assembled and placed in position just prior to use and operation of any clamping assembly.

In use, the pipes 14 and 16 are aligned with the gasket which may be of neoprene or other elastomeric resilient-type material inserted in the position shown in FIG. 2 with the gasket beads 36 and 38 engaged to form a seal. The clamp band 13 can be placed over the elastomeric gasket with the raised central section 51 nested over the raised area 40 to prevent the gasket from moving. in some embodiments the gasket can vary so as to have other retaining means or friction to hold it in position during assembly.

The clamping band 13 is then placed about the elastomeric gasket or can be preplaced thereon, with the outer flanges 49, 50 directed toward the underlying pipe. Tightening of the threaded bolts of the tension means 26, 28 then clamps the clamping assembly in position and locks the pipes in axial sealed alignment. Typically the ends 13′ and 13″ overlap by about ¾″ to 3 inches.

It is a feature of this invention that the annular space provided under the sheet metal clamping band which is reversely bent at each pipe encircling end such as shown in cross section at 80 allows for resilient flow of the resilient gasket during compression while the overturned flanges prevent outward flow beyond the edge of the clamping assembly. The band straps are prevented from movement by the recesses within which they fit.

As in prior art U.S. Pat. No. 4,101,151 the above-described assembly provides for the non-slip placement of the compressible band straps about the periphery of the pipes. Pre-positioning of the disposed band straps and an adjustable band clamp to tolerances and pipe diameters is provided with a sealing gasket which may be fixed in position. The clamping assembly may be manufactured economically and overcomes certain prior art disadvantages. Because of the overturned flanges, cold flow beyond the outer extremity of the clamping assembly is provided. When the assembly is in use and exposed to extremes of temperature and pressure, an outer limit for flow is always defined for the underlying gasket thus preventing unwanted flow which could act to loosen the joint during extremes of environmental and operating conditions. Moreover, the flanges provide an initial stop and positioning means in conjunction with the central raised area to positively position the entire clamping assembly on the joint and position the sheet metal clamping band with respect to the gasket.

In the preferred embodiment, the inner diameter defined by the inwardly extending flanges 49, 50 is substantially the same as the nominal outer diameter of a cast iron soil pipe so that the bottoms of the flanges bite into and grip the soil pipe when the band straps are compressed. This biting action further strengthens the joint. The number of each group of flanges 49 and 50 can vary depending on the number of slots provided. In the preferred embodiment sixteen flange sections make up each flange 49 and each flange 50.

Figure 4:
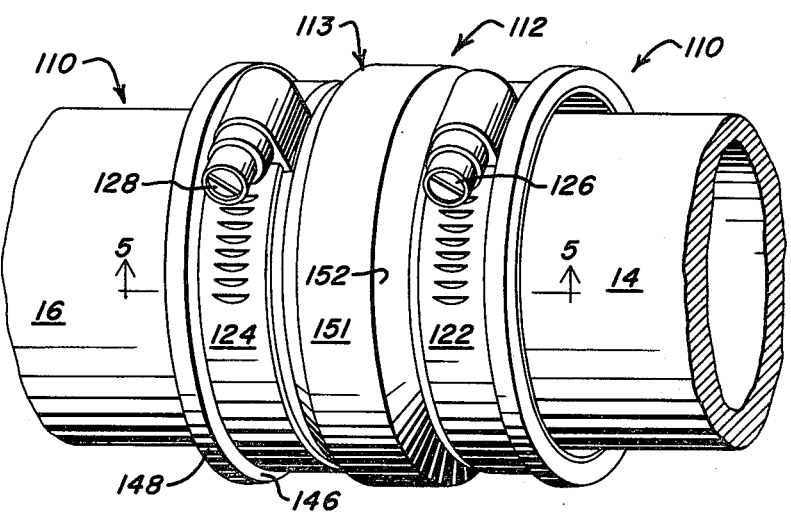
FIG. 4 is a perspective view of a pair of pipes assembled together with a second embodiment of the invention.
Figure 5:
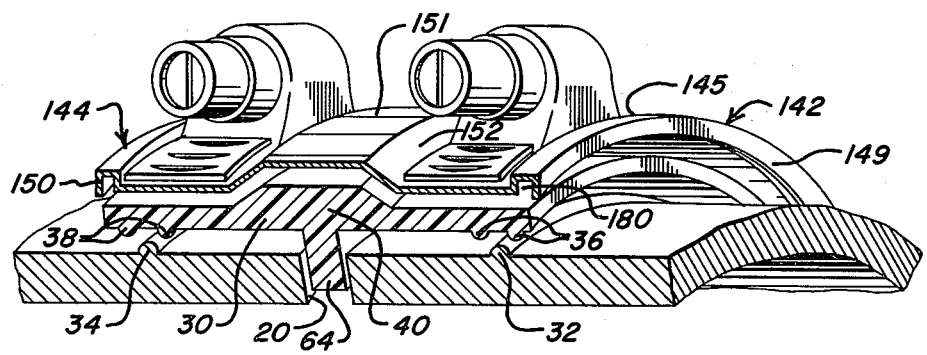
FIG. 5 is an enlarged sectional perspective view along lines 5—5 of FIG. 4.
Figure 6:
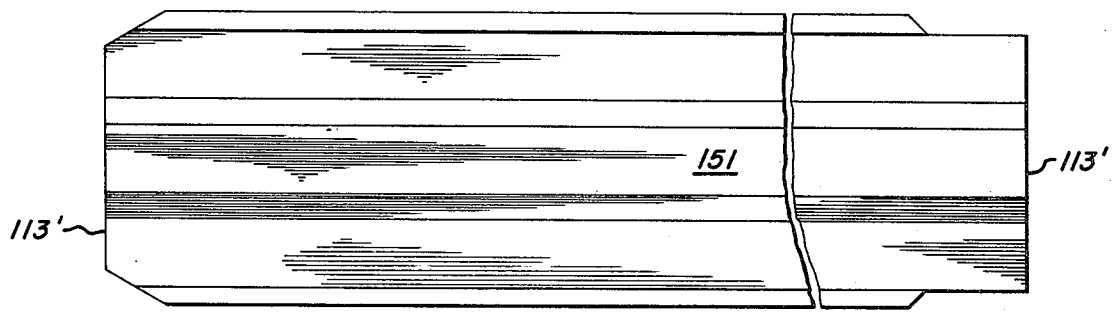
FIG. 6 is a top plan view of the clamping band of the clamp assembly of this embodiment.

In a second embodiment of this invention shown in FIGS. 4–6, a pipe assembly 110 is shown having a clamping assembly 112 in accordance with this invention. The assembly 112 is identical to the assembly 12 and all parts thereof which are identical are listed with number "1" before their corresponding number in the assembly 12. The only difference between the assembly 112 and 12 is that the slots 60 and 62 are eliminated making the clamping band solid and a more rigid unit in use. When this unit is clamped in position in a pipe joint, a more rigid joint is obtained. Moreover, the inner diameter defined by the depending flanges 149, 150 is preferably more exactly matched to the outer diameter of the pipe with which the clamp is used. This embodiment is particularly useful in connection with plastic pipe, fiberglass impregnated pipe, copper pipe and the like where outer diameters are more exact and precise with greater uniformity from one pipe end to another. When cast iron soil pipe is used as with the preferred embodiment, the slots give a spring finger action to the bent over flanges enabling them to better conform to slight variations in outer diameter as is customary with cast iron pipe. The embodiment of FIGS. 4–6 yields greater rigidity with all of the benefits previously described.

In all embodiments of this invention, the gasketing material is an elastomeric, sealing body and preferably a preformed tough rubbery material such as neoprene or neoprene-like material. The improvement of this invention is directed to maintaining proper compression sealing of neoprene-like materials having desired elastomeric properties while still permitting operation of the pipe at wide variances in environmental and operating temperatures and pressures. The sheet metal clamping band 13 is preferably a corrosion-resistant material such as 24 gauge, #304, 18-8 chrome nickel bearing stainless steel which has corrosion-resistant life over long time periods. The clamp dimensions can vary greatly depending upon the joints to be made but are often designed for use with pipe O.D.'s of from 1½ inch to 24 inches and axial lengths from flange 49 to 50 and 149 to 150 of from 2 to 10 inches. The stainless steel clamping band can be in known sheet metal thicknesses. The advantages of sheet metal provide for spring-like action when the slot are used and sufficient rigidity whether or not the slots are used, along with deformability necessary in pressure clamps of the present invention. Preferably the overall thickness of the preformed gasket is such that it is resiliently compressed to at least about 5% of its thickness when the band straps are tightened to seal.

While specific embodiments of the present invention have been shown and described, many variations are possible. In all cases, it is preferred to have positive positioning of the gasket by the preformed elastomeric gasket mating with a preformed shape of the stamped metal clamping band and a second positioner provided by flanges 49, 50 and 149, 150. While it is preferred that either end of the clamping assembly have the same diameter to accept the same outer diameter pipe, in some cases, the diameters can differ to act as a reducer or expander carrying pipe of different diameter at either end to be joined.

While a single bead 32, 34 is shown, on many pipe constructions, no pipe bead is used and resilient gasket beads 36 and 38 are resiliently compressed to form a backup gas and liquid seal over the underlying cylindrical pipe surface. In some cases, a second set of resilient annular beads can be provided, axially spaced on the inside surface of each gasket end, to provide a second sealing bead arrangement for each pipe end.

While the cross section of the ends 42, 44 and 142, 144 have generally right angle corners, these sections can be rounded or otherwise shaped. In all cases, an inwardly directed flange is provided to contain the gasket.

What is claimed is:

1. In a clamping assembly for joining two pipes in end to end relationship in a clamping position and having a flexible, corrosion resistant sheet metal clamping band of defined circumferential length having a first encircling end and a second encircling end axially spaced from the first encircling end, with a preformed raised central section extending generally the defined circumferential length of the clamping band, and band strap retaining areas extending on both sides of said central section, with tension bands mounted in said retaining areas on both sides of said central section adjacent said ends, said clamping band enclosing an underlying elastomeric compressible, circumferential sealing gasket having first and second gasket end surfaces and partially mounted against movement by said central section, the improvement comprising said first and second encircling ends extending from said retaining areas with said ends each carrying an upwardly and reversely extending section defining an inwardly directed substantially continuous, integral, bent over sheet metal flange having the thickness of said sheet metal facing said pipe positioned to extend toward an underlying pipe to grip said pipe and to prevent unwanted movement of said sealing gasket under operating conditions of said assembly with each said substantially continuous flange providing a stop against outward flow of said gasket beyond said flange by engaging substantially the entire end surface of said gasket so that said flange prevents cold flow beyond the flange.

2. An improvement in a clamping assembly in accordance with claim 1 and further comprising said band strap retaining areas and said first and second ends defining slots spaced thereabout to provide for variable compression of said inwardly directed flange at each end and dividing said substantially continuous flange into a plurality of substantially adjacent sections at each end maintaining said gasket end surfaces against axially directed cold flow, said flange sections each defining ends thereof formed of the wall thickness of said sheet metal and each positioned to face and grip an underlying pipe in use upon tightening of said tension bands.

3. A clamping assembly in accordance with claim 2 and further comprising said first encircling end having a cross section in a plane passing through an axis of said assembly which defines a space extending in an annular path around an axis of said assembly and said gasket in its preformed shape being positioned outside of said annular space, said slots extending inwardly from said flange for a distance of from ½ to 1 inches.

4. A clamping assembly coupling a plurality of pieces and comprising:
(a) two, opposing, generally axially aligned cylindrical pipes, each pipe having a peripheral edge placed in a generally abutting end relationship;
(b) a clamping assembly positioned circumferentially about and bridging the gap between the pipe ends in a clamping position, the clamping assembly comprising
 (a) a flexible, corrosion-resistant sheet-metal, clamping band of defined length surrounding circumferentially the ends of the pipes with the opposite ends of the clamping band in an overlapping, slidably adjustable, nesting relationship, the clamping band having
  (i) a raised edge bead along each outer edge of the band and extending generally about the circumference of the clamping band in the clamping position;
  (ii) a preformed, raised, central section extending generally the defined length of the clamping band;
  (iii) band-strap-retaining areas extending on both sides of the raised central section, the raised edge beads on each side and the sides of the raised central section forming two generally parallel band-strap-retaining areas of sufficient width to accommodate a flat band-strap therein, and
  (iv) a plurality of slots extending inwardly from the outer edges of the clamping band and generally longitudinal to the joint ends, the slots extending generally throughout the defined length to permit the adjustment of the clamping band in each band-strap-retaining area;
(b) a compressed, circumferential, sealing gasket disposed between the pipe ends and the overlapping clamping band and overlapping and bridging the entire junction between the pipe ends, the gasket characterized by an outwardly raised, peripheral, central section, which central section is contoured in form and fits snugly within the raised central section of the band clamp to prevent movement of the sealing gasket in the clamping position; and
(c) at least a pair of flat band straps, one strap disposed and positioned in each of the band-retaining areas of the band clamp, the band straps including a band-tensioning means, whereby the band straps may be tightened to compress the underlying sealing gasket into a fluid-tight sealing relationship, said raised edge beads on each side of said band strap retaining area defining a section of an inwardly directed substantially circumferentially continuous, integral, bent over sheet metal flange having an end formed of the thickness of said sheet metal, extending toward and gripping an underlying pipe at said flange end and acting to prevent flow of said gasket beyond said band clamp when said clamping band is compressed by having said flange engage substantially an entire end surface of said gasket.

* * * * *

UNITED STATES PATENT AND TRADEMARK OFFICE
CERTIFICATE OF CORRECTION

PATENT NO. : 4,380,348

DATED : April 19, 1983

INVENTOR(S) : Frederick R. Swartz

It is certified that error appears in the above-identified patent and that said Letters Patent is hereby corrected as shown below:

Claim 1, line 58, delete "pipe" and insert therefor —flange—.

Signed and Sealed this

Twenty-sixth Day of July 1983.

[SEAL]

Attest:

GERALD J. MOSSINGHOFF

Attesting Officer     Commissioner of Patents and Trademarks